(12) United States Patent
Wang

(10) Patent No.: US 7,630,736 B2
(45) Date of Patent: Dec. 8, 2009

(54) METHOD AND SYSTEM FOR SPATIAL DATA INPUT, MANIPULATION AND DISTRIBUTION VIA AN ADAPTIVE WIRELESS TRANSCEIVER

(75) Inventor: Ray Wang, McLean, VA (US)

(73) Assignee: Mobitrum Corporation, Silver Spring, MD (US)

( * ) Notice: Subject to any disclaimer, the term of this patent is extended or adjusted under 35 U.S.C. 154(b) by 660 days.

(21) Appl. No.: 11/541,102

(22) Filed: Sep. 29, 2006

(65) Prior Publication Data

US 2007/0090996 A1    Apr. 26, 2007

Related U.S. Application Data

(60) Provisional application No. 60/725,232, filed on Oct. 11, 2005.

(51) Int. Cl.
*H04M 1/00* (2006.01)
(52) U.S. Cl. .................. 455/553.1; 455/550.1; 375/232; 370/465
(58) Field of Classification Search .............. 455/550.1, 455/90.1, 553.1, 456.1, 422.1, 425; 370/469, 370/474, 338, 401, 208, 480, 343, 465; 375/316, 375/232, 350, 133, 130, 136
See application file for complete search history.

(56) References Cited

U.S. PATENT DOCUMENTS

| | | | |
|---|---|---|---|
| 3,960,722 A | 6/1976 | Tomikawa | |
| 4,048,075 A | 9/1977 | Colvin | |
| 4,053,677 A | 10/1977 | Corao | |
| 4,119,096 A | 10/1978 | Drews | |
| 4,135,564 A | 1/1979 | Muller | |
| 4,142,950 A | 3/1979 | Creamer | |
| 4,158,275 A | 6/1979 | Moore | |
| 4,221,854 A | 9/1980 | Hammar | |
| 4,222,563 A | 9/1980 | Heftler | |
| 4,226,408 A | 10/1980 | Tomita | |
| 4,280,075 A | 7/1981 | Comby | |
| 4,286,362 A | 9/1981 | Hammar | |
| 4,342,884 A | 8/1982 | Ban | |
| 4,343,690 A | 8/1982 | de Nora | |
| 4,373,027 A | 2/1983 | Berneman | |
| 4,400,287 A | 8/1983 | Kimura | |
| 4,440,000 A | 4/1984 | Bacchus | |
| 4,455,187 A | 6/1984 | von Blucher | |
| 4,479,875 A | 10/1984 | Nelson | |
| 4,562,015 A | 12/1985 | Lefevre | |
| 4,564,539 A | 1/1986 | Tsuji | |
| 4,654,556 A | 3/1987 | Comby | |
| 4,693,986 A | 9/1987 | Vit | |
| 4,698,768 A | 10/1987 | Thuy | |
| 4,751,869 A | 6/1988 | Paynter | |
| 4,781,056 A | 11/1988 | Noel | |

(Continued)

*Primary Examiner*—Sujatha Sharma
(74) *Attorney, Agent, or Firm*—Lesavich High-Tech Law Group, P.C.; Stephen Lesavich

(57) ABSTRACT

A method and system for spatial data manipulation input and distribution via an adaptive wireless transceiver. The method and system include a wireless transceiver for automatically and adaptively controlling wireless transmissions using a Waveform-DNA method. The wireless transceiver can operate simultaneously over both the short and long distances. The wireless transceiver is automatically adaptive and wireless devices can send and receive wireless digital and analog data from various sources rapidly in real-time via available networks and network services.

20 Claims, 13 Drawing Sheets

Smart Sensor Arch #1: Infrastructure

U.S. PATENT DOCUMENTS

| | | |
|---|---|---|
| 4,788,088 A | 11/1988 | Kohl |
| 4,837,850 A | 6/1989 | Maisel |
| 4,917,537 A | 4/1990 | Jacobson |
| 4,940,972 A | 7/1990 | Mouchot |
| 5,034,352 A | 7/1991 | Vit |
| 5,042,463 A | 8/1991 | Lekholm |
| 5,105,424 A | 4/1992 | Flaig |
| 5,128,789 A | 7/1992 | Abramovitz |
| 5,182,440 A | 1/1993 | Dufour |
| 5,207,687 A | 5/1993 | Bernon |
| 5,218,565 A | 6/1993 | Mou |
| 5,236,027 A | 8/1993 | Lu |
| 5,309,107 A | 5/1994 | Pausch |
| 5,365,518 A | 11/1994 | Noser |
| 5,396,359 A | 3/1995 | Abramovitz |
| 5,447,776 A | 9/1995 | Disselbeck |
| 5,448,389 A | 9/1995 | Peacock |
| 5,477,888 A | 12/1995 | Mezzalira |
| 5,512,828 A | 4/1996 | Pausch |
| 5,530,575 A | 6/1996 | Acampora |
| 5,545,318 A | 8/1996 | Richmond |
| 5,550,805 A | 8/1996 | Takatori |
| 5,571,080 A | 11/1996 | Jensen |
| 5,571,352 A | 11/1996 | Disselbeck |
| 5,581,187 A | 12/1996 | Pausch |
| 5,592,610 A | 1/1997 | Chittor |
| 5,606,666 A | 2/1997 | Grant |
| 5,670,278 A | 9/1997 | Disselbeck |
| 5,682,537 A | 10/1997 | Davies |
| 5,689,647 A | 11/1997 | Miura |
| 5,703,834 A | 12/1997 | Bonnefoy |
| 5,802,054 A | 9/1998 | Bellenger |
| 5,842,034 A | 11/1998 | Bolstad et al. |
| 5,884,017 A | 3/1999 | Fee |
| 5,891,632 A | 4/1999 | Imai |
| 5,934,614 A | 8/1999 | Mueller |
| 5,949,760 A | 9/1999 | Stevens |
| 5,959,999 A | 9/1999 | An |
| 5,963,546 A | 10/1999 | Shoji |
| 6,038,044 A | 3/2000 | Fee |
| 6,049,593 A | 4/2000 | Acampora |
| 6,113,080 A | 9/2000 | Kazuma |
| 6,143,029 A | 11/2000 | Rippstein |
| 6,154,587 A | 11/2000 | Okayama |
| 6,189,102 B1 | 2/2001 | Beser |
| 6,219,346 B1 | 4/2001 | Maxemchuk |
| 6,256,306 B1 | 7/2001 | Bellenger |
| 6,298,053 B1 | 10/2001 | Flammer, III |
| 6,314,163 B1 | 11/2001 | Acampora |
| 6,324,162 B1 | 11/2001 | Chaudhuri |
| 6,329,902 B1 | 12/2001 | Lee |
| 6,370,110 B1 | 4/2002 | Eslambolchi |
| 6,396,837 B1 | 5/2002 | Wang |
| 6,403,210 B1 | 6/2002 | Stuivinga |
| 6,460,128 B1 | 10/2002 | Baxter |
| 6,480,497 B1 | 11/2002 | Flammer, III |
| 6,549,513 B1 | 4/2003 | Chao |
| 6,618,611 B2 | 9/2003 | Gebhardt |
| 6,640,087 B2 | 10/2003 | Reed et al. |
| 6,654,379 B1 | 11/2003 | Grover |
| 6,711,166 B1 | 3/2004 | Amir |
| 6,735,393 B1 | 5/2004 | Zouganeli |
| 6,763,190 B2 | 7/2004 | Agrawal |
| 6,780,340 B2 | 8/2004 | Conta |
| 6,785,725 B1 | 8/2004 | Ramanan |
| 6,805,732 B1 | 10/2004 | Billiotte |
| 6,823,180 B2 | 11/2004 | Reed |
| 6,835,173 B2 | 12/2004 | Couvillon, Jr. |
| 6,848,006 B1 | 1/2005 | Hermann |
| 6,850,502 B1 | 2/2005 | Kagan |
| 6,853,641 B2 | 2/2005 | Lindhorst-Ko |
| 6,856,592 B2 | 2/2005 | Grover |
| 6,879,574 B2 | 4/2005 | Naghian |
| 6,904,364 B2 | 6/2005 | Randazzo |
| 6,909,903 B2 | 6/2005 | Wang |
| 6,912,204 B2 | 6/2005 | Kossi |
| 6,917,759 B2 | 7/2005 | DeBoer |
| 6,934,248 B1 | 8/2005 | DeBoer |
| 6,940,866 B1 | 9/2005 | Miller |
| 6,948,048 B2 | 9/2005 | Baxter |
| 6,965,575 B2 | 11/2005 | Srikrishna |
| 6,965,969 B2 | 11/2005 | Burger |
| 6,970,417 B1 | 11/2005 | Doverspike |
| 6,970,808 B2 | 11/2005 | Abhulimen |
| 6,999,441 B2 | 2/2006 | Flammer, III |
| 7,003,313 B2 | 2/2006 | Garces |
| 7,012,887 B2 | 3/2006 | Zhu |
| 7,027,388 B2 | 4/2006 | Wen |
| 7,031,293 B1 | 4/2006 | Srikrishna |
| 7,031,757 B2 | 4/2006 | Schwengler |
| 7,039,067 B2 | 5/2006 | Feinberg |
| 7,042,988 B2 | 5/2006 | Juitt |
| 7,043,250 B1 | 5/2006 | DeMartino |
| 7,050,819 B2 | 5/2006 | Schwengler |
| 7,053,853 B2 | 5/2006 | Merenda |
| 7,054,262 B2 | 5/2006 | Gerstel |
| 7,058,021 B2 | 6/2006 | Srikrishna |
| 7,068,873 B2 | 6/2006 | Frankel |
| 7,069,483 B2 | 6/2006 | Gillies |
| 7,088,676 B1 | 8/2006 | Doverspike |
| 7,088,920 B2 | 8/2006 | Krishnaswamy |
| 7,089,089 B2 | 8/2006 | Cumming |
| 7,106,261 B2 | 9/2006 | Nagel |
| 7,117,466 B2 | 10/2006 | Kalafala |
| 7,119,758 B2 | 10/2006 | Louzir |
| 7,123,589 B1 | 10/2006 | Dawes |
| 7,133,359 B2 | 11/2006 | Weis |
| 7,203,743 B2 | 4/2007 | Shah-Heydari |
| 7,215,658 B2 | 5/2007 | Alastalo |
| 7,215,926 B2 | 5/2007 | Corbett |
| 7,224,642 B1 | 5/2007 | Tran |
| 7,233,620 B2 | 6/2007 | Brommer |
| 7,239,238 B2 | 7/2007 | Tester |
| 7,239,850 B2 | 7/2007 | Pelkari |
| 7,242,664 B2 | 7/2007 | Einstein |
| 7,245,216 B2 | 7/2007 | Burkley |
| 7,248,217 B2 | 7/2007 | Mani |
| 7,251,570 B2 | 7/2007 | Hancock |
| 7,257,106 B2 | 8/2007 | Chen |
| 7,257,250 B2 | 8/2007 | Boier-Martin |
| 7,260,059 B2 | 8/2007 | Grover |
| 7,262,694 B2 | 8/2007 | Olsen |
| 7,263,379 B1 | 8/2007 | Parkulo |
| 7,269,347 B1 | 9/2007 | Matricardi |
| 7,271,736 B2 | 9/2007 | Siegel |
| 7,274,869 B1 | 9/2007 | Pan |
| 7,277,931 B1 | 10/2007 | Booth |
| 7,280,755 B2 | 10/2007 | Kang |
| 7,282,944 B2 | 10/2007 | Gunn |
| 7,283,494 B2 | 10/2007 | Hammel |
| 7,283,838 B2 * | 10/2007 | Lu .......................... 455/550.1 |
| 7,289,428 B2 | 10/2007 | Chow |
| 7,289,923 B2 | 10/2007 | Marovitz |
| 7,295,806 B2 | 11/2007 | Corbett |
| 7,298,240 B2 | 11/2007 | Lamar |
| 7,301,824 B1 | 11/2007 | New |
| 7,302,339 B2 | 11/2007 | Gray |
| 7,305,459 B2 | 12/2007 | Klemba |
| 7,308,198 B1 | 12/2007 | Chudack |
| 7,308,370 B2 | 12/2007 | Mason, Jr. et al. |
| 7,313,399 B2 | 12/2007 | Rhee et al. |
| 2002/0089712 A1 | 7/2002 | Kang |
| 2002/0181427 A1 | 12/2002 | Sparr et al. |
| 2003/0011839 A1 | 1/2003 | Liang |

| | | | | | | |
|---|---|---|---|---|---|---|
| 2005/0071714 A1 | 3/2005 | Soga et al. | 2006/0133817 A1 | 6/2006 | Xie | |
| 2005/0074019 A1 | 4/2005 | Handforth | 2006/0154642 A1 | 7/2006 | Scannell | |
| 2005/0135286 A1 | 6/2005 | Nurminen et al. | 2006/0159024 A1 | 7/2006 | Hester | |
| 2005/0138359 A1 | 6/2005 | Simon | 2006/0182076 A1 | 8/2006 | Wang | |
| 2005/0141641 A1 | 6/2005 | Tanaka et al. | 2006/0262737 A1 | 11/2006 | Livet | |
| 2005/0185606 A1 | 8/2005 | Rayment | 2006/0268910 A1 | 11/2006 | Kawahara | |
| 2005/0190778 A1 | 9/2005 | Ozluturk | 2007/0014573 A1 | 1/2007 | Wei | |
| 2005/0193357 A1 | 9/2005 | Honary | 2007/0066874 A1 | 3/2007 | Cook | |
| 2005/0243765 A1 | 11/2005 | Schrader | 2007/0086361 A1 | 4/2007 | Allan | |
| 2005/0246112 A1 | 11/2005 | Abhulimen | 2007/0091871 A1 | 4/2007 | Taha | |
| 2005/0272430 A1 | 12/2005 | Griebling | 2007/0189249 A1 | 8/2007 | Gurevich | |
| 2005/0282494 A1 | 12/2005 | Kossi | 2007/0206521 A1 | 9/2007 | Osaje | |
| 2006/0031659 A1 | 2/2006 | Chow | 2007/0206616 A1 | 9/2007 | Orth | |
| 2006/0039449 A1* | 2/2006 | Fontana et al. ............... 375/130 | 2008/0025330 A1 | 1/2008 | Wang | |
| 2006/0045124 A1 | 3/2006 | Dahlstrom | 2008/0181288 A1* | 7/2008 | Wurzbach et al. ........... 375/224 |
| 2006/0095539 A1 | 5/2006 | Renkis | 2009/0046625 A1* | 2/2009 | Diener et al. ............... 370/319 |
| 2006/0120387 A1 | 6/2006 | Yang | 2009/0098828 A1* | 4/2009 | Furman et al. ............. 455/63.1 |
| 2006/0133332 A1 | 6/2006 | Achanta | | | | |
| 2006/0133807 A1 | 6/2006 | Jenkins | * cited by examiner | | | |

Sensing and Monitoring: Aircraft - icing on wings - data from heaters and sensors

- Integrate sensor and data acquisition for detection of ice accretion

FIG. 7
300 
Sensing and Monitoring: Aircraft emissions – collection of data around airports
- Integrate sensor and data acquisition for detection of emissions, air quality, and any data sensed around airport.
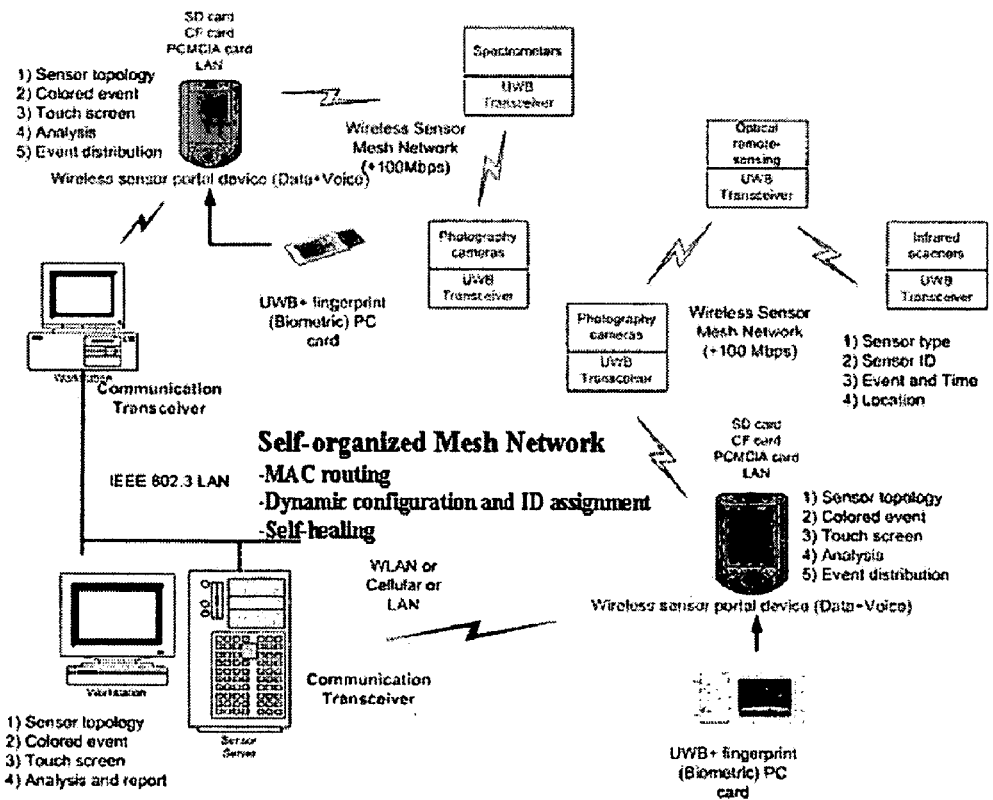

Sensor Geolocation 350

- High precision radiolocation for asset and personnel tracking and to enable a variety of location-aware services
  - UWB track badge with both voice and data capabilities
  - UWB RFID for asset tracking and location
  - Personnel local positioning system
- RFID

FIG. 9
400 
Other Applications
- Wireless home networking
- Sensor network communications
- See-through-the-walls
- Ground penetrating radars (GPRS)
- Medical imaging
- Position location – inventory
- Collision avoidance system for cars
- Surveillance
- Planetary exploration
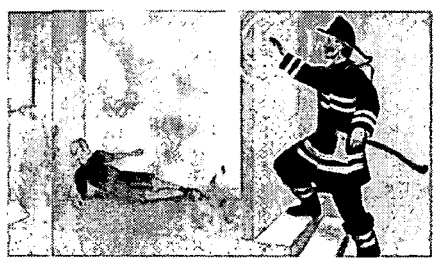
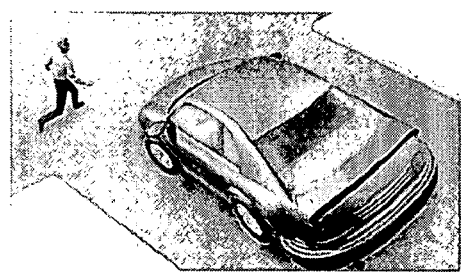
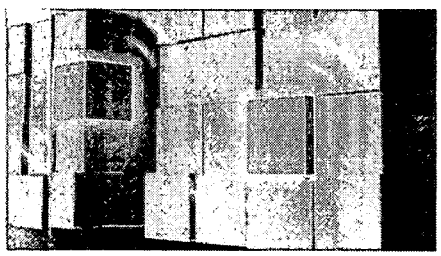

FIG. 12
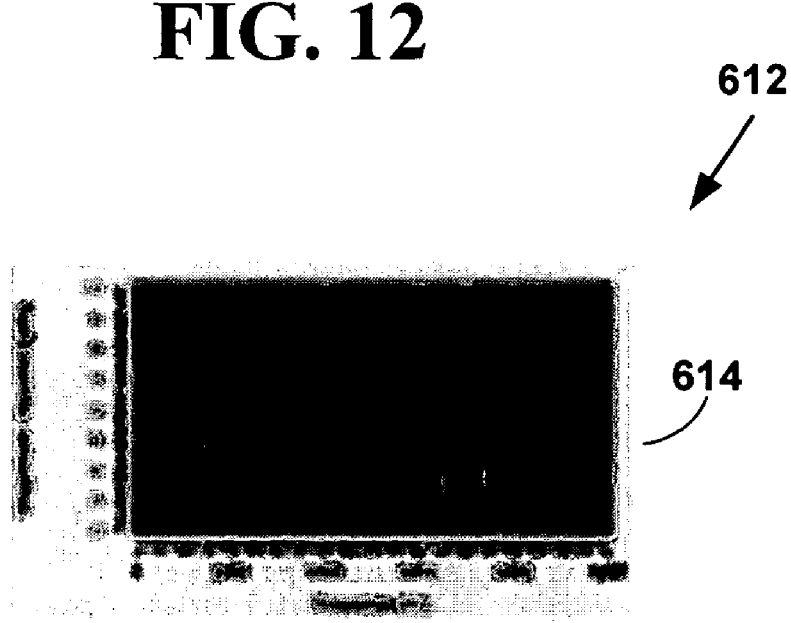
NARROW BAND SPECTRUM WIRELESS WAVEFORM
SPREAD SPECTRUM WIRELESS WAVEFORM

METHOD AND SYSTEM FOR SPATIAL DATA INPUT, MANIPULATION AND DISTRIBUTION VIA AN ADAPTIVE WIRELESS TRANSCEIVER

CROSS REFERENCES TO RELATED APPLICATIONS

This application claims priority from U.S. Provisional Application 60/725,232, filed Oct. 11, 2005, the contents of which are incorporated by reference.

U.S. GOVERNMENT RIGHTS

This invention was made, in part or in whole, with U.S. Government support Contract Number NNS06AA11C, awarded by the NASA. The U.S. Government has certain rights in this invention.

FIELD OF THE INVENTION

This invention relates to processing data from electronic sensors. More specifically, it relates to a method and system for spatial data manipulation input and distribution via a wireless waveform adaptive transceiver.

BACKGROUND OF THE INVENTION

There are many types of computer and communications networks in existence. One variety of such networks is a sensor network or a mesh sensor network.

A mesh sensor network is a self-organizing networks built from plural sensor nodes that may spontaneously create an impromptu network, assemble the network themselves, dynamically adapt to device failure and degradation, manage movement of sensor nodes, and react to changes in task and network requirements. The plural sensor nodes are reconfigurable smart sensor nodes that are self-aware, self-reconfigurable and autonomous.

A mesh network is a network that employs one of two connection arrangements, full mesh topology or partial mesh topology. In the full mesh topology, each node is connected directly to each of the others. In the partial mesh topology, nodes are connected to only some, not all, of the other nodes.

Some of the features of mesh sensor networks include: (1) support tactical and surveillance applications using reconfigurable sensor network nodes that are capable of forming impromptu network, being deployed incrementally, and assembling themselves without central administration; (2) adapt dynamically to device failure and degradation and changes in task and network requirements; and (3) Integrate various application-specific network and system services provided by mixed types of sensor nodes and embedded civilian and defense applications.

Wireless sensor networks provide distributed network and Internet access to sensors, controls, and processors that are deeply embedded in equipment, facilities, and the environment. Wireless sensor networks provide monitoring and control capability for applications in transportation, manufacturing, health care, environmental monitoring, and safety and security. Wireless sensor networks provide low power signal processing, low power computation, and low power, low cost wireless networking capability in a compact system. Wireless sensor networks provide sensing, local control, and embedded intelligent systems in structures, materials, and environments.

There are a number of problems associated with wired and wireless sensor networks that included wired and wireless transceivers. One problem is that a number of independent sensors each make a local decision and then try to combine these decisions at a central point to generate a global decision. Routing, bandwidth, and power constraints determine the quality of the distributed detection and/or estimation decision. Another problem is that is often difficult to determine a load on a senior network and what resources are required to determine a desired quality of service.

Another problem is that many sensor networks are used to determine spatial data including the location of objects. Location prediction is used to determine locations of a spatial phenomenon from maps of other spatial features such as building walls, natural phenomenon such as mountains, etc.

Another problem is that some mesh sensor networks are mobile networks in which it is assumed at least some of the sensor nodes of the network are mobile units that change position over time. The dynamic management of complex routing information is very difficult. Mobile sensor networks include plural client units in such as a personal digital/data assistant (PDA), mobile phone, or other mobile unit for airport lounges, shopping malls, offices, etc.

Another problem is that many wireless technologies are already available for sensor applications; each has its own characteristics in resource, battery life, bandwidth, nodes per network, and ranges. It is inevitable that many non-interoperable wireless technologies between 400 MHz and 5.8 GHz will be deployed for wireless sensor applications. As a result, communications across different wireless interfaces will become a challenge for sensor data collection and management due to lack of interoperability between them. Therefore, it is necessary for a transceiver to be able to dynamically adapt different wireless operating environments such as radio frequency, power, receiver sensitivity, and data rate. This capability serves a key function to achieve interoperability and, hence, maximize sensor's service availability to rapidly, in real time, ingest data sequentially from a variety of input sensors, provide initial field verification of data, and distribute the data to various nodes and servers at collection, processing, and decision hub sites.

Another problem is it difficult to identify known wireless waveform signals and automatically adapt a wireless transceiver to control an identified wireless signal.

Thus, it would be desirable to solve some of the problems associated with wireless transceivers used on mesh, sensor and other wireless networks.

SUMMARY OF THE INVENTION

In accordance with preferred embodiments of the present invention, some of the problems associated with sensor networks are overcome. A method and system for spatial data manipulation input and distribution via an adaptive wireless transceiver is provided.

The method and system include a wireless transceiver for automatically and adaptively controlling wireless transmissions using a Waveform-DNA method. The wireless transceiver can operate simultaneously over both the short and long distances. The wireless transceiver is automatically adaptive and wireless devices can send and receive wireless digital and analog data from various sources rapidly in real-time via available networks and network services.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 7 is a block diagram illustrating a sensing and monitoring application for aircraft emissions;

FIG. 9 is a block diagram illustrating other types of sensing and monitoring applications.

FIG. 12 is a block diagram illustrating exemplary wireless signal waveforms including narrowband and spread spectrum waveforms from which data is collected and stored on the adaptive transceiver.

DETAILED DESCRIPTION OF THE INVENTION

Figure 1A:
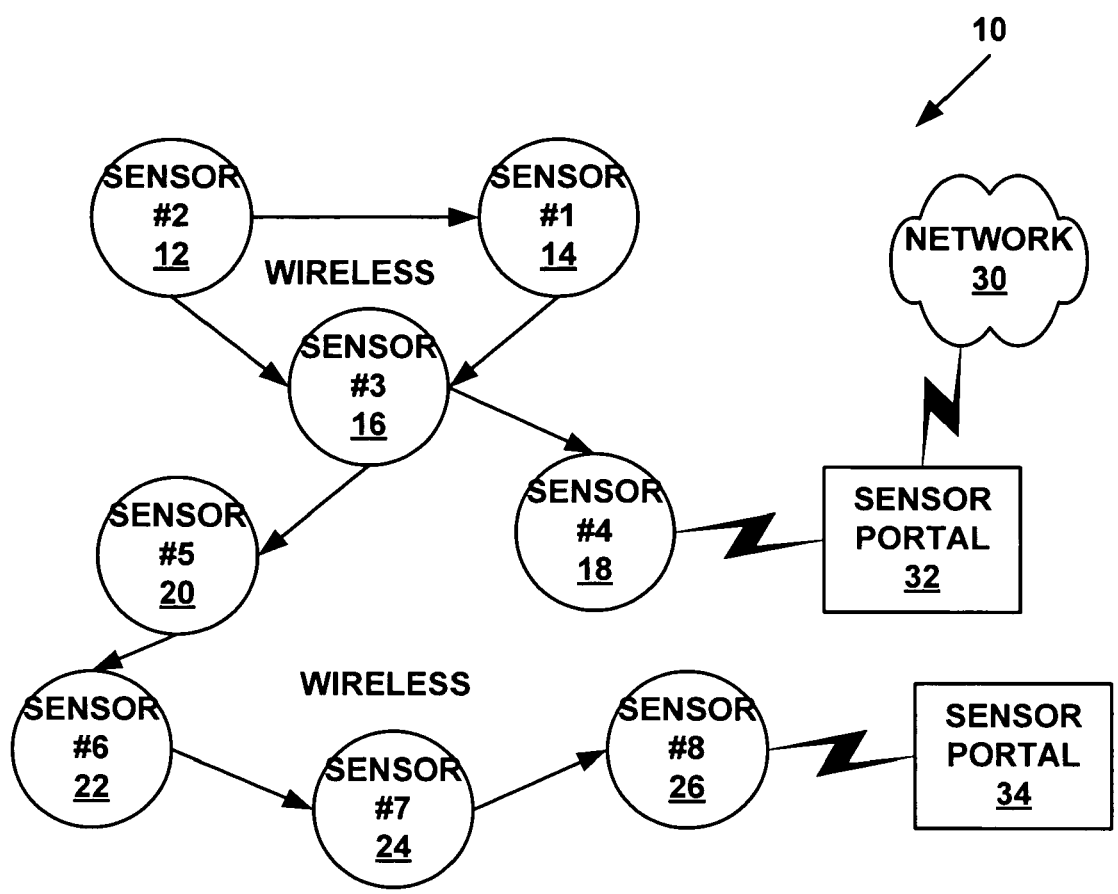
FIG. 1A is a block diagram of a smart sensor network infrastructure.
Figure 1B:
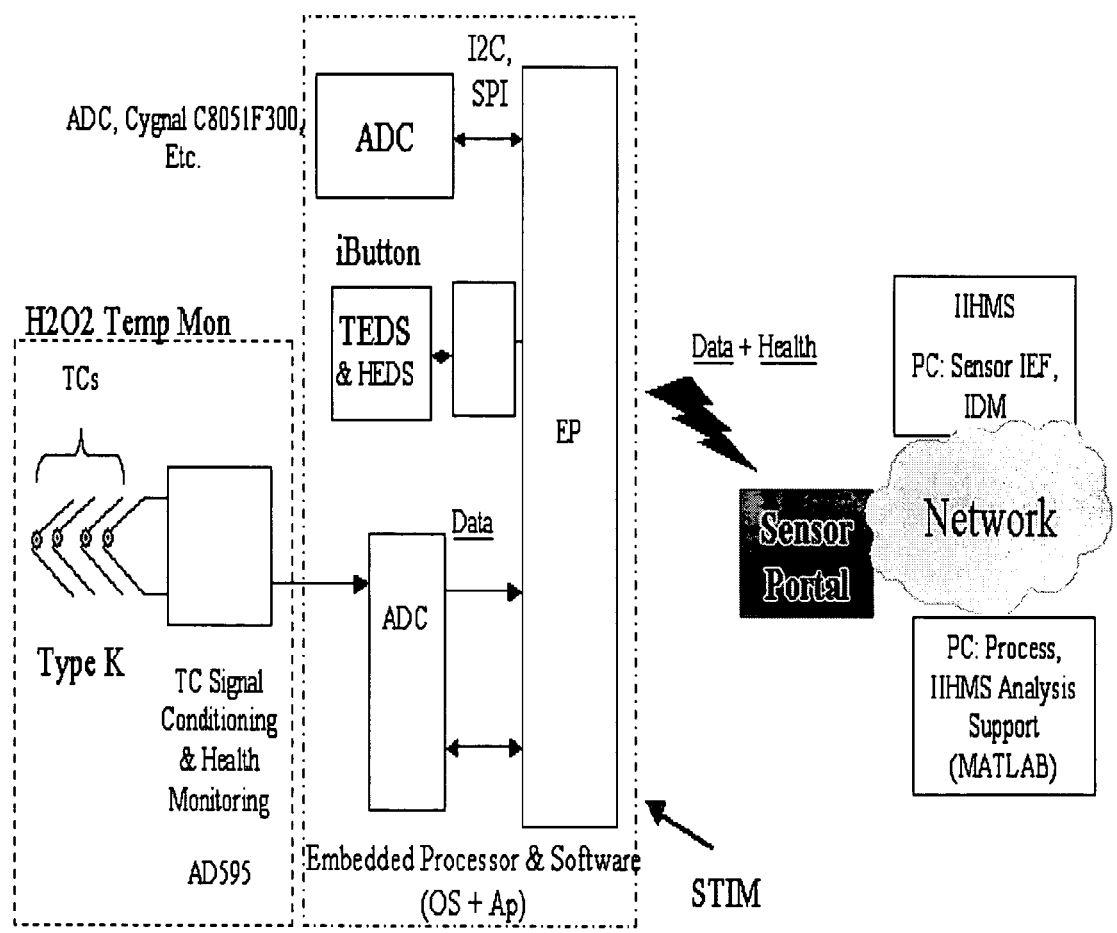
FIG. 1B is a block diagram of another smart sensor network infrastructure.
Figure 2:
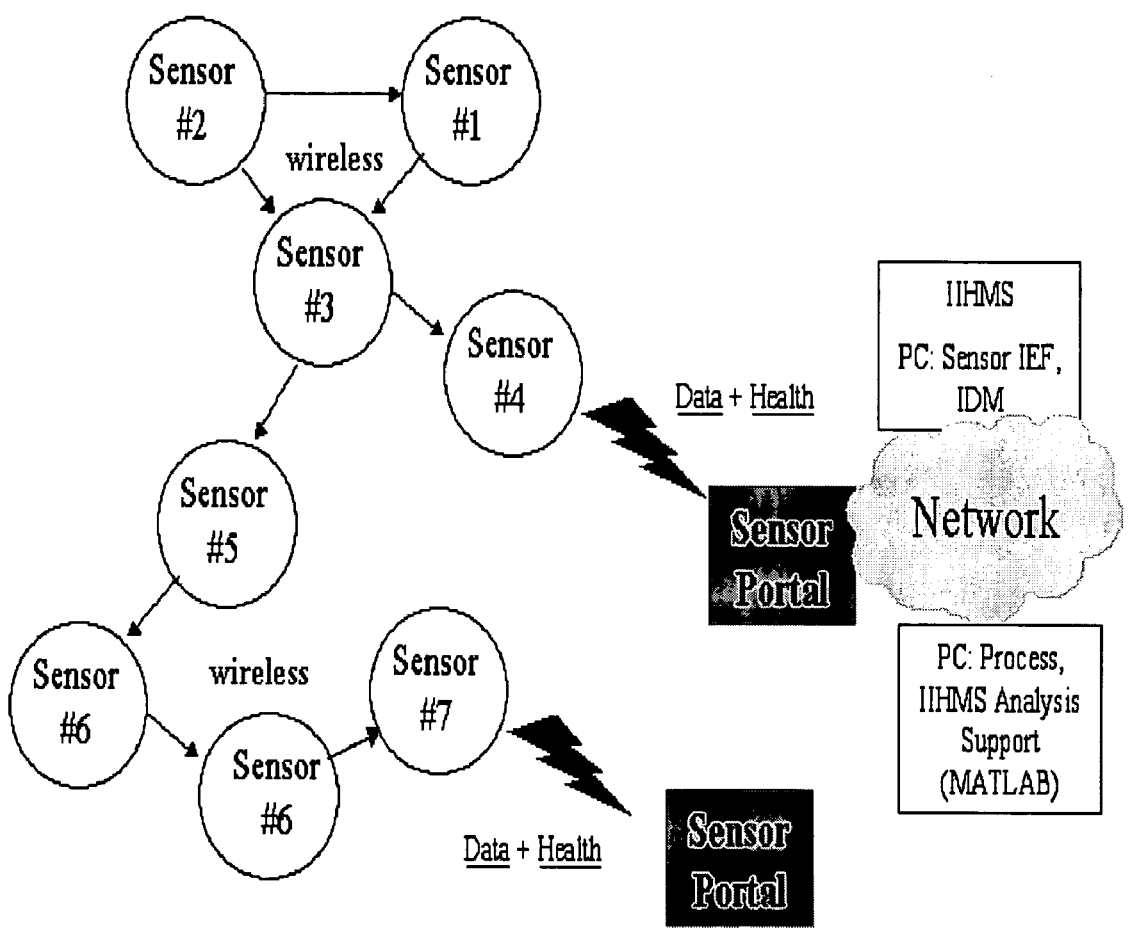
FIG. 2 is a block diagram of a smart sensor network mesh architecture.

FIG. 1A is a block diagram of a smart sensor network infrastructure 10;

FIG. 1B is a block diagram of another smart sensor network infrastructure 36;

FIG. 2 is a block diagram of a smart sensor network mesh architecture 50.

Figure 3:
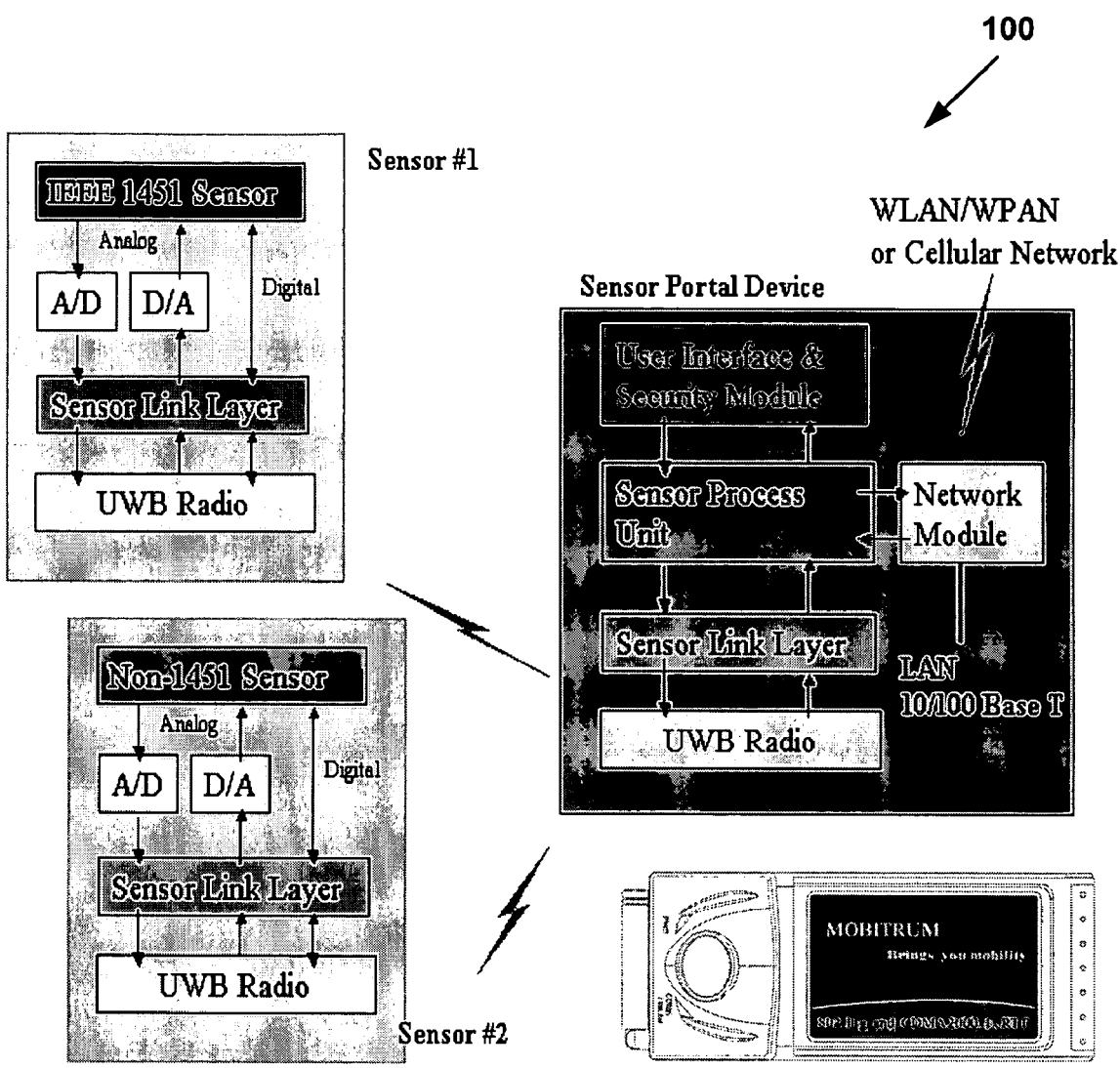
FIG. 3 is a block diagram of a smart sensor architecture.

FIG. 3 is a block diagram of a smart sensor architecture 100.

Figure 4:
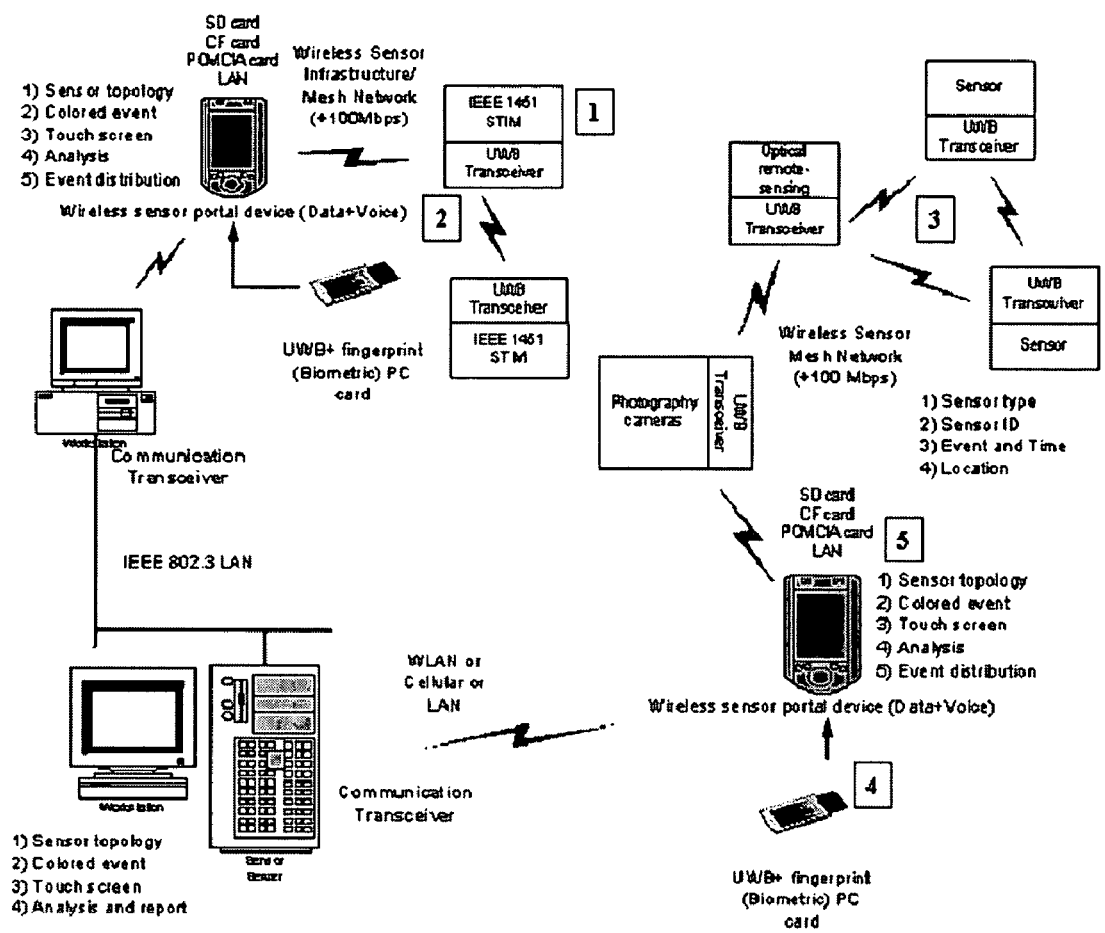
FIG. 4 is a block diagram of a self-organized mesh network topology.

FIG. 4 is a block diagram of a self-organized mesh network topology 150.

The architectures illustrated in the figures include Smart Transducer Interface Modules (STIM) and Ultra wideband transceiver (Physical layer), Mesh network protocol (MAC layer), Authentication and encryption software (Link layer), Wireless sensor portal (WSP) device with a TFT high-resolution user graphic interface and sensor topology display and an Organizing Agent (OA). The OA is responsible for collecting and organizing sensor data in a fashion that allows for a particular class of queries to be answered.

Preferred embodiments of the present invention include network devices and interfaces that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." Bluetooth Forum documents can be found at the URL "www.bluetooth.com." WAP Forum documents can be found at the URL "www.wapforum.org." ADSL Forum documents can be found at the URL "www.adsl.com."

An operating environment for devices and interfaces of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection ("OSI") reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

In one embodiment of the present invention, the wireless sensor devices include but are not limited to, an IEEE 802.11a, 802.11b, 802.11g, 802.11n, "Wireless Fidelity" ("Wi-Fi"), IEEE 802.15.4 (Zigbee), "Worldwide Interoperability for Microwave Access" ("WiMAX"), ETSI High Performance Radio Metropolitan Area Network (HIPERMAN) or "Radio Frequency (RF) Home" wireless interfaces. In another embodiment of the present invention, the wireless sensor device may include an integral or separate Bluetooth (IEEE 802.15.1 a) and/or infra data association (IrDA) module for wireless Bluetooth or wireless infrared communications. Industrial, Scientific and Medical (ISM) 400 MHz, 800 MHz, and 900 Mhz wireless interface are also used. However, the present invention is not limited to such an embodiment and other 802.11xx and other types of wireless interfaces can also be used.

As is known in the art, an 802.11b is a short-range wireless network. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. 802.11n is a high-speed and longer distance WLAN standard which can deliver data up to 300 Mbps. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

Devices and interfaces of the present invention include security and encryption. Wireless Encryption Protocol ("WEP") (also called "Wired Equivalent Privacy") is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access ("WPA") and Robust Security Network ("RSN").

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol ("EAP"). One proposed encryption algorithm is an Advanced Encryption Standard ("AES") encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard ("AES") to keep government information secure. AES is intended to be a stronger, more efficient successor to Triple Data Encryption Standard ("3DES"). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt ("EDE") mode of the DES cipher algorithm. 3DES is defined in the ANSI standard, ANSI X9.52-1998, the contents of which are incorporated herein by reference. DES modes of operation are used in conjunction with the NIST Federal Information Processing Standard ("FIPS") for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified ("SBU") communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, IP is an addressing protocol designed to route traffic within a network or between networks. For more information on IP 54 see IETF RFC-791 incorporated herein by reference.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768 incorporated herein by reference.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destingation at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

Figure 5:
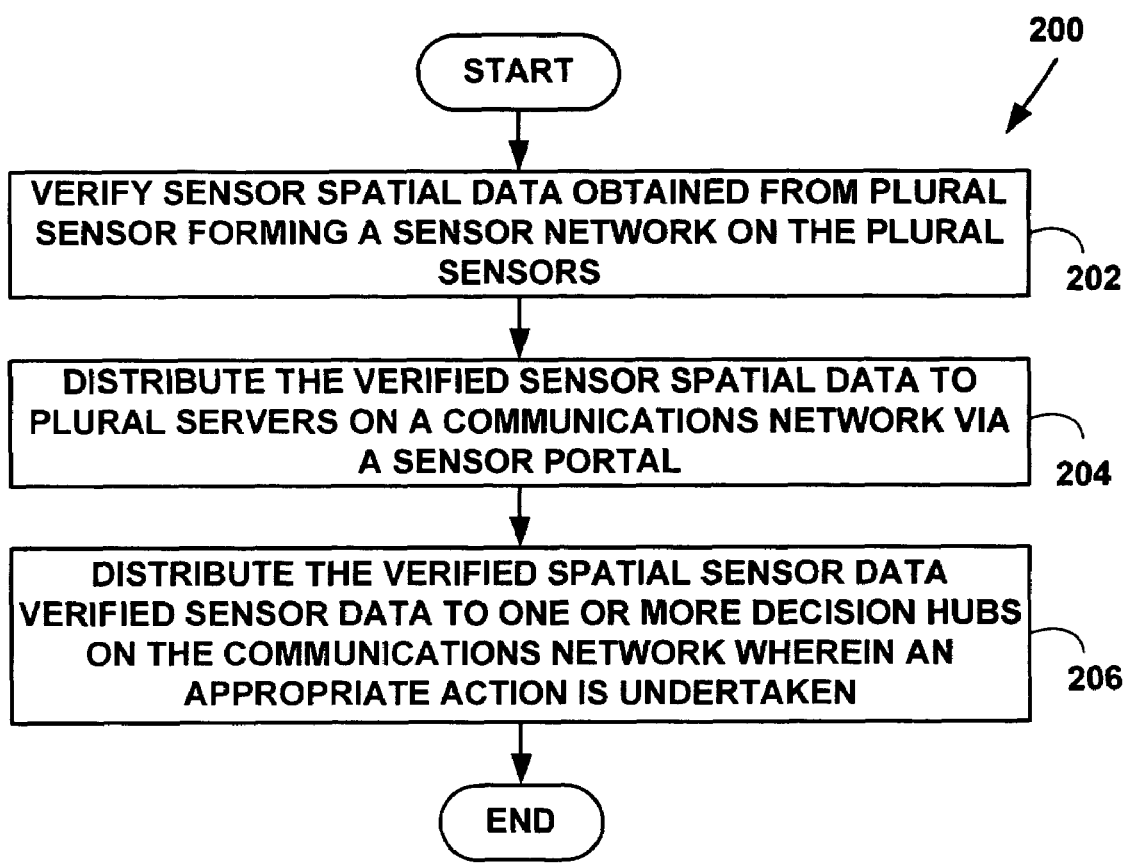
FIG. 5 is a flow diagram illustrating a method for processing spatial data from sensor networks.

FIG. 5 is a flow diagram illustrating a Method 200 for processing spatial data from sensor networks. At Step 202, spatial sensor data obtained from plural sensors forming a sensor network is verified on the plural sensors. At 204, the verified sensor data is distributed to plural servers on a communications network via a sensor portal. At Step 206, the verified sensor data verified sensor data is distributed to one or more decision hubs on the communications network wherein an appropriate action is undertaken.

The method and system described herein integrate sensor data acquisition for distributed sensing and monitoring for example, for rocket propulsion testing, agricultural efficiency, coastal management, disaster management, ecological forecasting, energy management, homeland security, and detecting ice accretion and detection of emissions, air quality, other data sensed around specific environments and other applications.

The method and system described herein can be used for these exemplary applications: (1) Sensing and monitoring for Aircraft—icing on wings—data from heaters and sensors; (2) Aircraft emissions—collection of data around airports; (3) Verification and validation of equipment (e.g., Radio Frequency Identifiers "RFID"); and (4) Security—geolocation and personal location. However, the present invention is not limited to these applications and the present invention can be applied to other applications.

Figure 6:
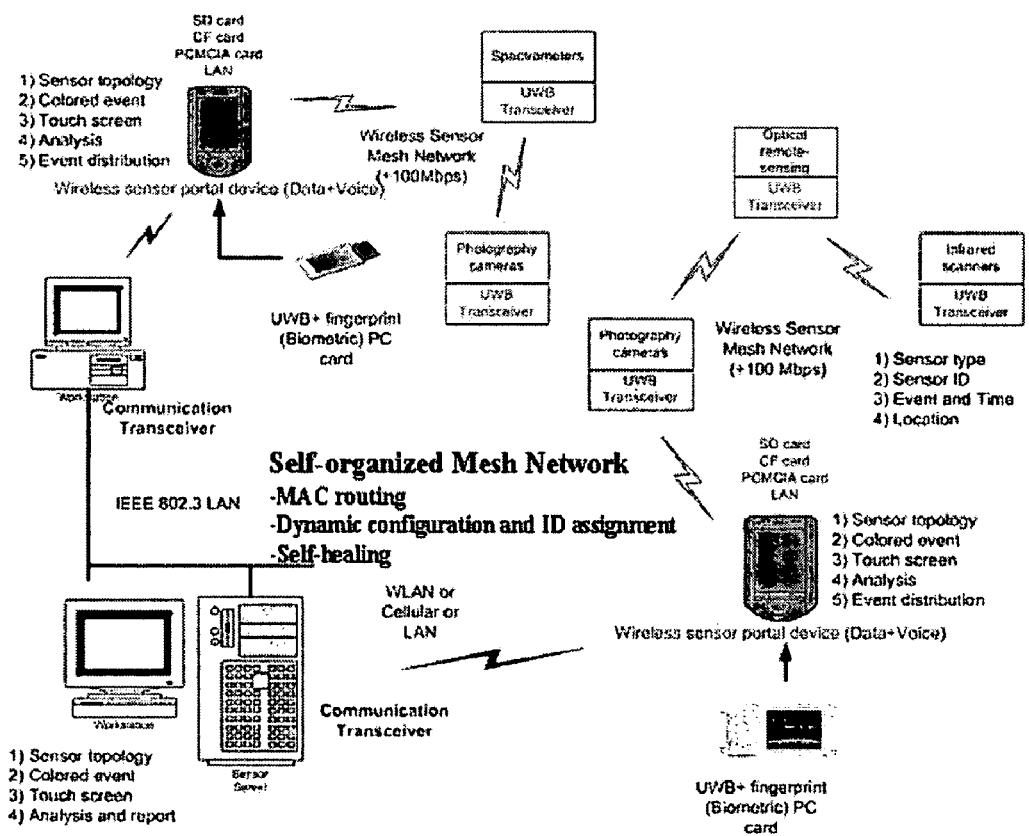
FIG. 6 is a block diagram illustrating a sensing and monitoring application for aircraft.

FIG. 6 is a block diagram 250 illustrating a sensing and monitoring application for aircraft.

FIG. 7 is a block diagram 300 illustrating a sensing and monitoring application for aircraft emissions.

Figure 8:
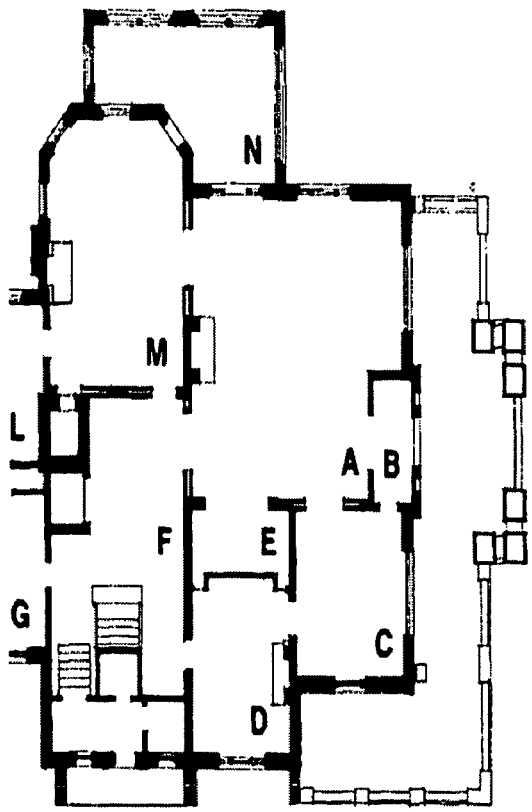
FIG. 8 is a block diagram illustrating a sensing and monitoring application for security.

FIG. 8 is a block diagram 350 illustrating a sensing and monitoring application for security.

FIG. 9 is a block diagram 400 illustrating other types of sensing and monitoring applications.

The method and system described herein may provide the following advantages: (1) Spatial data is Extremely Difficult to Intercept—Wideband pulsed radar spreads the signal and allows more users access to a limited amount of scarce frequency spectrum, thus allowing spectrum reuse; (2) Multipath Immunity—A low path loss and low energy density minimizes interference to other services. UWB is very tolerant of interference, enabling operation within buildings, urban areas, and forests; (3) Precision Network-wide timing—Real-time, continuous position location down to a centimeter of resolution results in precision geolocation systems (4) Low Cost—Requires minimal components resulting in small size and weight; (5) Low Power—Typical consumption is in microwatts; and (6) Antennas—Can be very small (2 cm) because they are non-resonant.

Waveform Adaptive Wireless Transceiver

With the adaptive nature of wireless devices, such wireless devices can send and receive digital and analog data from various sources rapidly in real-time via available network and services. A new Waveform-DNA based adaptive wireless transceiver is presented whose interface can be configured via a self-contained method to achieve self-managing without service interruptions. The Waveform-DNA method is aimed to adjust transceiver's characteristics of the wireless interface according to the waveform of its Radio Frequency (RF) wireless signal receives.

This Waveform-DNA method is based the natural process of Deoxyribonucleic Acid (DNA) coding known in the medical arts. As is known in the biological arts, in living cells, the synthesis of genes via DNA molecules, is a quantum process. Quantum theory is one theoretical basis of modern physics that explains the nature and behavior of matter and energy on the atomic and subatomic level DNA molecules exist exclusively in quantum states with a fixed energy and an associated waveform (i.e., wave function) or probability distribution. In one embodiment, the Waveform-DNA method includes using data values form quantum states and probability distributions for known wireless signal waveforms to quickly and efficiently identify a known and controllable wireless signal waveform.

The Waveform-DNA method is similar to a process of DNA coding structure used in medical world. Waveform-DNA method can, but is not limited to: (1) determine waveforms of known wireless RF signal waveforms; (2) Read/compare RF signal waveforms; and (3) Control known RF signal waveforms. The signal waveforms of known RF signals of interest are pre-digitized and stored in the transceiver to compare with an RF signal waveform that is actually received through a wideband antenna. Once the type of a RF signal waveform is identified, the intelligent software in the transceiver configures its RF characteristics and protocols to adapt wireless interface dynamically.

Figure 10:
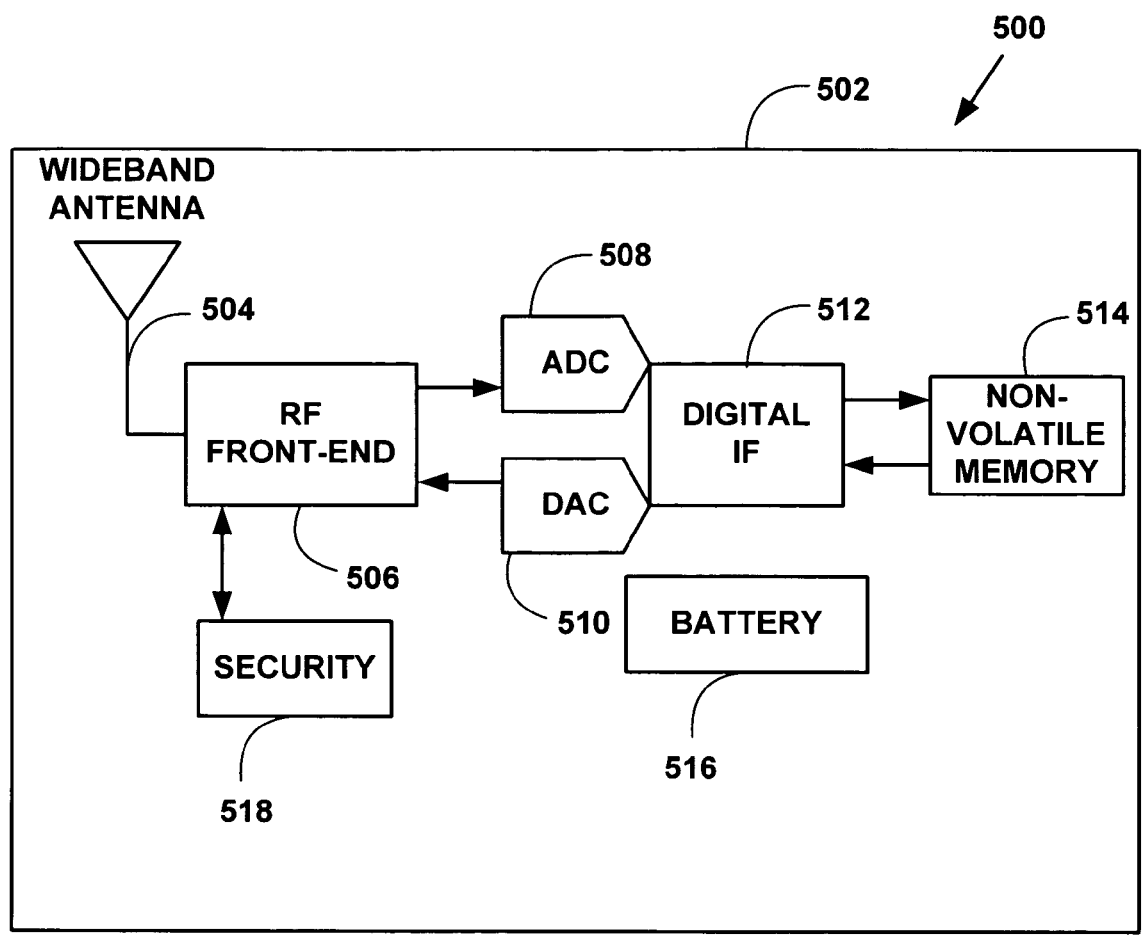
FIG. 10 is a block diagram illustrating a Waveform-DNA base adaptive wireless transceiver.

FIG. 10 is a block diagram 500 illustrating a waveform-based adaptive wireless transceiver 502. The transceiver includes a wideband antenna 504, a multi-mode wireless radio frequency (RF) interface 506 including short range and long range wireless modes, an analog-to-digital (ADC) converter 508, a digital to analog converter (DAC) 510, a digital interface 512, plural known waveforms and an adaptive control application with a Waveform-DNA application stored in non-volatile memory 514, a battery 516 and a security module 518.

Zero-configuration digital interface 512: The transceiver 502 is configured via a self-contained method to achieve self-managing without service interruptions. The transceiver 502 maximizes spectrum reusability and autonomously adapts by automatically changing signals on the wireless interface 506 to control, communicate or perform pre-determined activities (e.g., sensing, etc.) on distributed sensor networks, mesh networks and other types of networks.

As is known in the art, a wideband interface includes transmission rates from 64 Kbps to greater than 2 Mbps.

Multi-Mode wireless RF interface 506: The transceiver 502 is a low-cost, configurable multi-mode modular platform, which comprises short and long distance wireless modules: (1) a short-range wireless module to interface with the wireless sensor networks and mesh networks; and (2) a long-range communications module to interface with remote data collection hubs, control centers and other wireless networks.

In one embodiment, the short range wireless interface includes, but is not limited to, IEEE 802.15.4/4b (ZigBee), IEEE 802.15.1/1a (Bluetooth), IEEE 802.15.3a (ultra-wideband), or IEEE 802.11a/b/g (WiLAN) wireless interface. However, the present invention is not limited to such an embodiment, and other types of short range interfaces can also be used to practice the invention.

The long-range wireless module includes, but is not limited to, IEEE 802.16a/e (WiMAX), IEEE 802.11n or ETSI HIPERMAN long-rang wireless interface. However, the present invention is not limited to such an embodiment, and other types of long range interfaces can also be used to practice the invention.

All wireless interfaces have embedded software, firmware or middleware to achieve zero-configuration.

Adaptive Automatic Monitoring—The transceiver 502 dynamically, automatically and adaptively adjust wireless signals on its RF interface 506 in terms of wireless signal frequency, signal quality, signal power consumption and other wireless signal waveform characteristics.

For example the transceiver 502 automatically adapts its wireless signal based on an identified wireless signal waveform for control of distributed sensing applications such as: agricultural efficiency, coastal management, disaster management, ecological forecasting, energy management, homeland security, and detecting ice accretion and detection of emissions, air quality, and any data sensed around specific environments.

In one embodiment, the transceiver 502 uses a Waveform-DNA method to compare wireless signal waveforms. Wireless signal waveforms of interest are pre-digitized and stored in the transceiver 502 to compare with those actually received through the wideband antenna 504. However, the present invention is not limited to such an embodiment another methods can also be used to practice the invention.

In one embodiment, numerical data values collected from data points determined from quantum states and probability distributions for known wireless signal waveforms are collected and stored and used with the Waveform-DNA method.

Signal Waveform-DNA Profile—The characteristics of plural different types of pre-determined wireless signal waveforms are stored in profiles and used for adaptive configurations such signal quality, power consumption, and desirable bandwidth for data transmission related quality of service (QoS). The QoS parameters are configurable based on profile setting. Profiles include, but are not limited to, type of wireless interface, data rate, delay sensitivity, data error rate and security.

Reuse Wireless Bandwidth—The transceiver 502 improves spectrum efficiency through a Waveform-DNA based reasoning about the air interface, media content, and communication context.

Service and Network Transparency—The transceiver 502 works with any network protocols such as TCP/IP, UDP/IP, IPX, Telnet, FTP, Secure socket, PPP, L2TP, PPTP, and MPLS, etc., The IEEE 1451.X family protocols are also transparent to the transceiver. Quality of Service (QoS) mechanism associated with standard IP protocol supports high-resolution base map data and transmits still video and photos.

Precision Location- and Condition-aware Sensor Data Portal—The transceiver 502 includes a precision clock synchronization reference within milliseconds. The clock reference is based on IEEE 1588 Standard for Precision Clock Synchronization for Networked Measurement and Control System. The sensor associated health events can be accurately visualized on a Geographic Information System (GIS) for managements and event distributions. The transceiver 502 incorporates GPS for location-based services include recording precision geo-positioning (X,Y,Z coordinates) data to support ongoing requirements.

Biometric Security—The transceiver 502 includes fingerprint digitization and cryptograph solutions to generate a unique private key. Along with the public key, two keys are used for users authentication, data encryption and decryption. The key structure complies with industry standard—Public Key Infrastructure (PKI) and Advanced Encryption Standard (AES), Triple Data Encryption Standard (3DES), etc.

IEEE 1451 Smart Sensor—The transceiver 502 supports IEEE 1451.2 and IEEE 1451.4 smart sensor interfaces with embedded metadata such as Transducer Electronic Data Sheet (TEDS) for sensor inquiry and health monitoring.

The transceiver with the Waveform-DNA method 502:

1. Enables real-time ingestion of data sequentially from several input sensors across heterogeneous wireless sensor networks with various wireless frequencies.

2. Provides rapid field verification of data.

3. Supports data distributions across short- and long-haul communications.

4. Supports wireless long-haul backup to wired sensor networks.

5. Supports standard-based communication protocol stacks including Quality of Service (QoS) for bandwidth intensive applications such as still/streaming video and photo with high-resolution capability.

6. Supports embedded metadata based on the IEEE 1451.X standard for smart sensors.

7. Supports geo-location capability with embedded GPS or software based geo-location algorithms for both indoors and outdoors location and tracking applications.

8. Supports emergency responders.

The opportunity for adaptive wireless technology is in wireless networks and communications. There are tremendous business applications and deployments for cellular 4G networks based on adaptive radios beyond 2004. The transceiver 502 is used to handle the need for increasing popularity of mobile handheld including PDA/Cell phones brings with it an opportunities for the adaptive radio, which serves a key factor to make handheld deployable throughout heterogeneous wireless networks whether for corporations or for individuals. As a result, "true mobility" is created through the programmable radio bands. Therefore, more value-added services are deployable and increase revenue to wireless service providers and handheld makers. The transceiver 502 provides NASA and other organizations an effective wireless device for Earth science, data relay, and other situational awareness.

Figure 11:
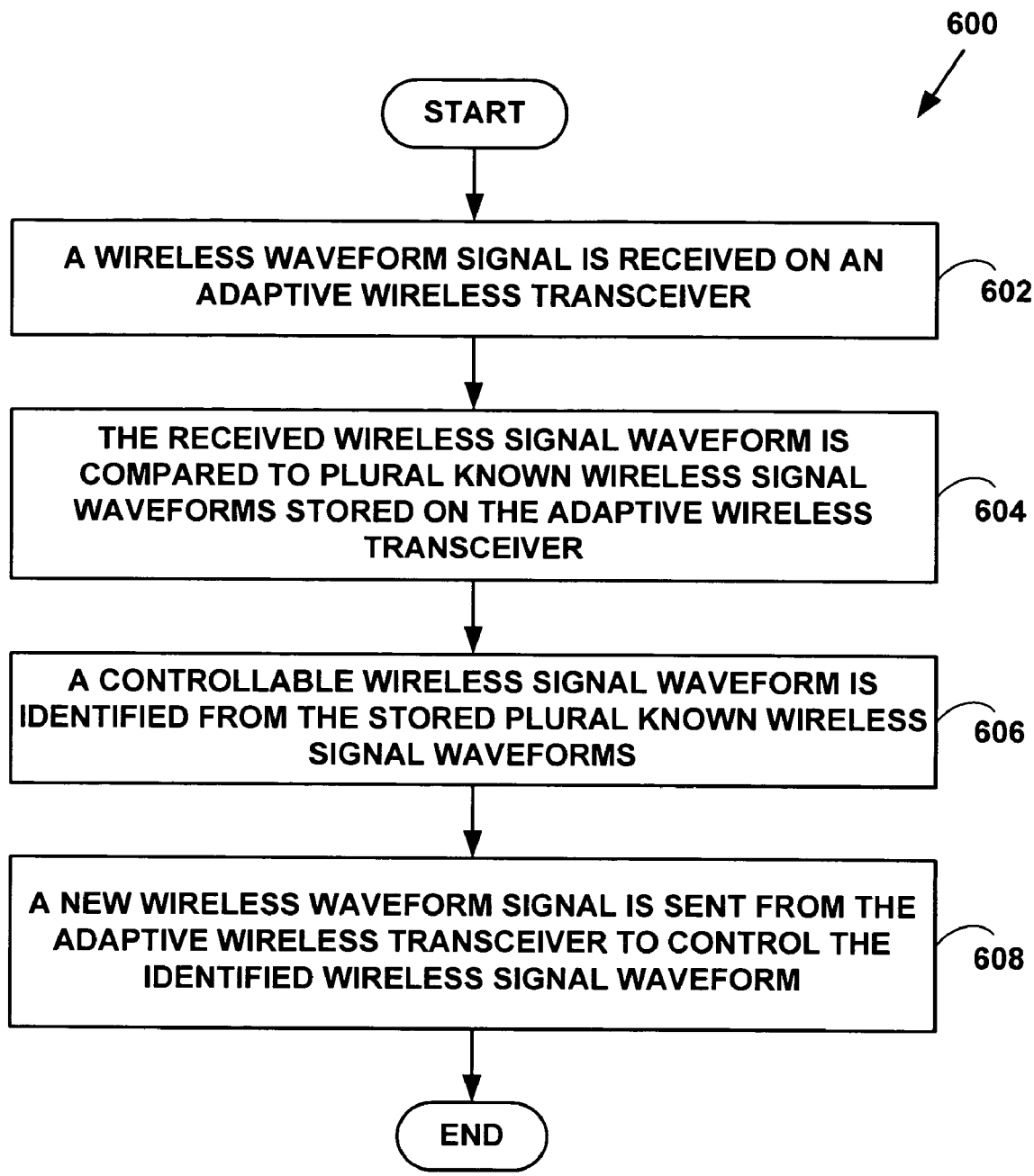
FIG. 11 is flow diagram illustrating a Waveform-DNA method for adaptive wireless waveform control.

FIG. 11 is a Waveform-DNA Method 600 for adaptive wireless signal waveform control. At Step 602, a wireless waveform signal is received on an adaptive wireless transceiver. At Step 604, the received wireless signal waveform is compared to plural known wireless signal waveforms stored on the adaptive wireless transceiver. At Step 606 a controllable wireless signal waveform is identified from the stored plural known wireless signal waveforms. At Step 608, a new wireless waveform signal is sent from the adaptive wireless transceiver to control the identified wireless signal waveform.

This Method 600 automatically adapts the transceiver's 502 characteristics of the wireless interface 506 according to a wireless signal waveform received.

In one embodiment Method 600 uses the Waveform-DNA method to compare wireless signal waveforms. Known wireless signal waveforms of interest are pre-digitized and stored in the transceiver 502 to compare with those actually received through the wideband antenna 504. The known wireless signal waveform include, but are not limited to, wireless signal waveforms from wireless devices and wireless sensors used on mesh networks, sensor networks and other types of wireless networks.

Once the type of wireless waveform signal is identified, the intelligent software in the transceiver 502 re-configures its RF characteristics and protocols to adapt wireless interface dynamically to control the identified known wireless waveform signal.

FIG. 12 is a block diagram 612 illustrating exemplary wireless signal waveforms including narrowband 614 and spread spectrum 616 waveforms from which data is collected and stored on the adaptive transceiver 502.

By adding the adaptive transceiver 502, a sensor data acquisition system 12 provides autonomous sensing and monitoring across many different types of wireless interfaces.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A waveform based adaptive wireless transceiver, comprising in combination:
    a wideband antenna to send and receive wireless signal waveforms to and from a wireless network;
    a multi-mode wireless radio frequency (RF) interface including short range wireless interface and a long range wireless modes connected to the wideband antenna;
    an analog-to-digital (ADC) converter connected to the multi-mode wireless radio frequency interface;
    a digital to analog (DAC) converter connected to the multi-mode wireless radio frequency interface;
    a digital interface connected to the ADC converter and the DAC converter;
    a plurality of pre-determined wireless signal waveforms and an adaptive control application using a Waveform-DNA method stored in non-volatile memory connected to the digital interface,
    wherein adaptive control application is used to identify a known wireless signal waveform and automatically adapt a wireless signal using sent from the multi-mode wireless RF interface based on the identified known wireless signal waveform to control the identified known wireless signal waveform; and
    a battery to provide power.

2. The transceiver of claim 1 further comprising a security module.

3. The transceiver of claim 1 wherein the security module includes Public Key Infrastructure (PKI), Advanced Encryption Standard (AES) or Triple Data Encryption Standard (3DES) encryption methods.

4. The transceiver of claim 1 wherein the short range wireless interface includes an IEEE 802.15.4b (ZigBee), IEEE 802.15.1a (Bluetooth), IEEE 802.15.3a (ultra-wideband), an IEEE 802.11a, 802.11b, 802.11g, or Industrial, Scientific and Medical (ISM) 400 MHz, 800 MHz, and 900 Mhz wireless interfaces.

5. The transceiver of claim 1 wherein the long range wireless interface includes an IEEE 802.11n, IEEE 802.16a or 802.16e (WiMAX) interface or an ETSI High Performance Radio Metropolitan Area Network (HIPERMAN) wireless interface.

6. The transceiver of claim 1 wherein the plurality of pre-determined signal waveforms include a plurality of pre-determined controllable signal waveforms for a plurality of different wireless sensor devices.

7. The transceiver of claim 1 wherein the adaptive control application includes adaptively controlling wireless signal frequency, wireless signal quality and wireless signal power consumption.

8. The transceiver of claim 1 wherein the wireless signal quality includes adaptively controlling data rate, delay sensitivity, data error rate and data security.

9. The transceiver of claim 1 wherein the wireless network includes a wireless mesh network or a wireless sensor network.

10. The transceiver of claim 1 wherein the multi-mode wireless radio frequency (RF) interface includes IEEE 1451.1, 1451.2, 1451.3, 1451.4 and 1451.5 smart sensor interfaces.

11. The transceiver of claim 1 wherein the digital interface includes geo-location capability with embedded global positioning services (GPS) or geo-location services for both indoors and outdoors location and tracking.

12. The transceiver of claim 1 wherein the digital interface includes biometric security applications.

13. The transceiver of claim 1 wherein the digital interface includes distributed sensing applications for agriculture, coastal management, disaster management, ecological forecasting, energy management, security, detection of ice accretion, detection of emissions, or air quality.

14. The transceiver of claim 1 wherein the adaptive control application uses a Waveform-DNA method includes comparing data values collected from quantum states and probability distributions for known wireless signal waveforms to quickly and efficiently identify and control a received wireless signal waveform.

15. A waveform based adaptive wireless transceiver, comprising in combination:
    means for receiving a wireless signal waveform;
    means for storing a plurality of pre-determined wireless signal waveforms;
    means for comparing a received wireless signal waveform to the plurality of pre-determined wireless signal waveforms and identifying a controllable wireless signal waveform with a Waveform-DNA method; and
    means for automatically adapting a wireless signal waveform being sent from the wireless transceiver based on the identified wireless signal waveform to control the wireless signal waveform with the Waveform-DNA method.

16. A Waveform-DNA method for adaptive wireless signal waveform control, comprising:
    receiving a wireless waveform signal on an adaptive wireless transceiver;
    comparing the received wireless signal waveform to a plurality of known wireless signal waveforms stored on the adaptive wireless transceiver;
    identifying a controllable wireless signal waveform from the stored plurality of known wireless signal waveforms; and
    sending a new wireless waveform signal on the adaptive wireless transceiver to control the identified wireless signal waveform.

17. The method of claim 16 further comprising a computer readable medium having stored therein instructions for causing one or more processor to execute the steps of the method.

18. The method of claim 16 wherein the comparing step includes comparing the wireless waveform signal to a plurality of known wireless signal waveforms stored on the adaptive wireless transceiver using a Waveform-DNA data set.

19. The method of claim 16 wherein the Waveform-DNA data set includes data values collected from quantum states and probability distributions for known wireless signal waveforms to quickly and efficiently identify and control a received wireless signal waveform.

20. The method of claim 16 adaptive wireless transceiver comprises:

means for receiving a wireless signal waveform;

means for storing a plurality of pre-determined wireless signal waveforms;

means for comparing a received wireless signal waveform to the plurality of pre-determined wireless signal waveforms and identifying a controllable wireless signal waveform with a Waveform-DNA method; and means for automatically adapting a wireless signal waveform being sent from the wireless transceiver based on the identified wireless signal waveform to control the wireless signal waveform using the Waveform-DNA method.

* * * * *